Patented May 14, 1946

2,400,402

UNITED STATES PATENT OFFICE 2,400,402

NONGELLING STARCH COMPOSITION

James W. Evans, St. Paul, Minn., assignor to General Mills, Inc., a corporation of Delaware No Drawing. Application June 5, 1944,
Serial No. 538,887

12 Claims. (Cl. 106—211)

The present invention relates to a starch product possessing non-congealing properties.

In various applications of starch in which a gelatinized solution or suspension in water is prepared, considerable difficulty has been experienced with the gel formation resulting after a short period of standing. This difficulty has necessitated the use of the prepared starch within a short period of time. Moreover, it is not possible to preserve such starch solutions from day to day but the preparation of fresh solutions each day is essential.

The value of a starch solution as a sizing, coating and adhesive ingredient is dependent to a great extent upon its viscosty under conditions of use. Starch solutions of relatively high concentration are desirable for many uses but have a tendency to congeal at ordinary temperatures or after standing for a short period of time. For example, in paper coatings the starch adhesive must remain sufficiently free flowing in high solids concentration in order to permit even spreading of the coating mixture and penetration of the adhesive into the paper stock. In sizing operations it is necessary for the starch solution to remain fluid and homogenous for several hours until it is all consumed. The starch solution that does this prevents waste and gives a better finished product.

By means of the present invention it is possible to prepare starch solutions which are non-congealing which can be used for a period of several hours, or even days. The non-congealing starch of the present invention permits an even impregnation of starch into fabrics which imparts a "soft" and "full" feel without hashness or brittleness. The more uniform distribution of the coating makes possible an enhanced appearance of the finished fabric. It is also possible to employ higher concentrations of starch where greater stiffness is desired without the danger of congealing ordinarily accompanying starch solutions of high concentration.

These advantages are obtained by means of the present invention which involves an insoluble starchy preparation containing preferably between .5 and 2 per cent of an alkylolamine soap. It has been found that these soaps in general have the propery of preventing gellation of starch solutions so that such solutions remain fluid and can be used advantageously over long periods of time. Furthermore, the alkylolamine soaps serve as wetting and softening agents and as lubricants. As the alkylolamine soaps are stable at high temperatures, they do note cause yellowing of fabrics as do many soaps used for lubricating purposes.

A wide variety of alkylolamine soaps have been found suitable for the above purpose. In general, mono, di or trialkylolamine soaps, or mixtures thereof, may be used. The effectiveness of these soaps increases from the mono through the di, to the trialkylolamine soaps. The ethanolamine soaps have been found desirable in view of their ready availability. However, amines containing other alkylol groups, such as isopropanolamine can be used in place of the ethanolamines. There is likewise considerable latitude in the fatty acid employed in the soap, although it is preferred to employ fatty acids containing between 10 and 18 carbon atoms. Both saturated and unsaturated fatty acids may be used for this purpose.

Conventional starches may be employed for the present invention. For example, starches from sweet potato, mandioca, corn, rice and wheat have been found to work satisfactorily. It is also possible to use these starches in the unmodified form or in a modified form, such as acid-treated starches and oxidized starches, as well as mixtures of the same.

The following examples are illustrative only and are not to be construed as limiting the invention.

*Example 1*

99 pounds of acid-modified commercially dry wheat starch having an alkali fluidity of 67 was mixed with 1 pound of triethanolamine stearate. The mixture was ground until homogeneous.

The above product was tested according to the standard congealing test Federal Specification for Starch, Laundry, published in the Federal Standard Stock Catalog, section IV (part 5), December 5, 1933, JJJ-S-701-3, F-2b. This test is as follows:

"Mix 11 ounces of laundry starch with one gallon of cold water. Bring the mixture to a boil and continue the boiling for 20 minutes, stirring frequently. The resultant paste, which, as heretofore stated, should be free from lumps and uniform throughout, should then be allowed to stand until cold. The paste should not congeal or assume a state which would preclude its quickly penetrating fabrics."

The above product was found to be non-congealing according to this test after a period of 96 hours after preparation of the starch paste.

*Example 2*

9 gallons of a 22 Baumé slurry of acid-modified wheat starch having an alkali fluidity of 64 was mixed with a solution of 0.32 pound of triethanolamine stearate mixture (made from 61.3 per cent stearic acid and 38.7 per cent triethanolamine) in 330 ml. methanol. The slurry was then stirred for 30 minutes following which it was dewatered and dried. The soap appears to be adsorbed on the starch and little loss of soap results from the above dewatering. Any soap remaining dissolved in the water can be recovered in a subsequent batch. A paste prepared from this product was non-congealing after several months. Moreover, fabrics dipped in the warm, freshly prepared paste or in a paste three weeks old were finished with equally desirable results.

*Example 3*

A product was prepared in the same manner as in Example 2 and with the same proportions with the exception that tri-isopropanolamine stearate was used in place of the triethanolamine stearate. A paste prepared from this product was non-congealing after 48 hours.

*Example 4*

A product was prepared the same as in Example 2 with the exception that an acid-modified wheat starch having an alkali fluidity of 56 was used. A paste prepared from this product was non-congealing after 48 hours.

*Example 5*

A product was prepared the same as in Example 2 with the exception that an acid-modified corn starch having an alkali fluidity of 54 was used. A paste prepared from this product was non-congealing after 48 hours.

*Example 6*

14.4 gallons of a 20.5 Baumé slurry of hypochlorite oxidized wheat starch having a Scott fluidity of 30 was mixed with 0.53 pound of triethanolamine stearate mixture (made from 60 per cent stearic acid and 40 per cent triethanolamine) in 600 ml. methanol. The slurry thus produced was then stirred for 30 minutes, following which the starch was dewatered as, for example, by filtering or centrifuging, and then dried. A paste prepared from this product was non-congealing after several months.

*Example 7*

15 gallons of a 22 Baumé slurry of unmodified wheat starch was mixed with 0.20 pound of triethanolamine stearate mixture (made from 61.3 per cent stearic acid and 38.7 triethanolamine) in 250 ml. methanol. The slurry was stirred for 30 minutes, following which the starch was dewatered and dried. A paste prepared from this product was non-congealing after 48 hours.

*Example 8*

3.95 pounds of a 10 per cent solution of diethanolamine laurate in water was added to 10 gallons of a 22 Baumé slurry of acid modified wheat starch (Scott fluidity 48). The mixture was stirred for 15 minutes after which the slurry was dewatered and the resulting starch cake dried. A paste prepared from the dried starch cake was not congealed after 24 hours.

*Example 9*

1.4 pounds of a 28 per cent solution of triethanolamine oleate in methanol was added to 10 gallons of a 22 Baumé slurry of acid modified wheat starch (Scott fluidity 48) and the mixture stirred for 15 minutes. The slurry was dewatered and the resulting starch cake dried. A paste prepared from the dried starch cake was not congealed after 24 hours.

With reference to all the above examples, the starch without the added soap had a congealing time of about 2 hours.

Numerous modifications of the above examples are possible as will readily be apparent to those skilled in the art. Concentration of the soaps with reference to starch may vary from 0.5 per cent upwards, depending upon the type of starch, degree and type of modification and on the desired concentration of starch solution. The concentration of the starch solution may be varied depending upon the use to which it is to be put.

The soaps may be dry-blended with the starch, may be added as a solution to the dry starch, or a solution of the soaps as, for example, a solution of the soap in water, methanol or other suitable solvent, may be added to a starch slurry before dewatering and drying. It is not essential that the alkylolamine soaps be composed of the stoichiometric proportions of fatty acid and amine but an excess of either fatty acids or amine may be present, as desired. Likewise, it is possible to have present borax, sodium hexametaphosphate, the effect of which is influenced by degree and type of modification of the starch. In place of the hypochlorite oxidized starches, starches oxidized by other agents may be used. For example, unmodified wheat starch containing 1 per cent triethanolamine stearate may be mixed with 1.4 sodium perborate and the mixture slurried with water and cooked. Solutions of 20 per cent starch concentration prepared in this manner have been found to be non-congealing for weeks. While various modifications of the invention have been described, it is to be understood that the same is not limited thereto but may be varied within the scope of the appended claims.

I claim as my invention:

1. A non-congealing starch preparation comprising an insoluble starch and an alkylolamine soap, said soap being present in the approximate range of 0.5 to 2 per cent, by weight, of the starch.

2. A non-congealing starch preparation comprising an insoluble starch and an ethanolamine soap, said soap being present in the approximate range of 0.5 to 2 per cent, by weight, of the starch.

3. A non-congealing starch preparation comprising an insoluble starch and an ethanolamine stearate, said stearate being present in the approximate range of 0.5 to 2 per cent, by weight, of the starch.

4. A non-congealing starch preparation comprising an insoluble starch and triethanolamine soap, said soap being present in the approximate range of 0.5 to 2 per cent, by weight, of the starch.

5. A non-congealing starch preparation comprising an insoluble acid-modified starch and alkylolamine soap, said soap being present in the approximate range of 0.5 to 2 per cent, by weight, of the starch.

6. A non-congealing starch preparation comprising an insoluble oxidized starch and an alkylolamine soap, said soap being present in the approximate range of 0.5 to 2 per cent, by weight, of the starch.

7. A non-congealing starch preparation comprising an insoluble unmodified starch and an alkylolamine soap, said soap being present in the approximate range of 0.5 to 2 per cent, by weight, of the starch.

8. A non-congealing starch preparation comprising an insoluble acid-modified starch and triethanolamine soap, said soap being present in the approximate range of 0.5 to 2 per cent, by weight, of the starch.

9. A non-congealing starch preparation comprising an insoluble oxidized starch and a triethanolamine soap, said soap being present in the approximate range of 0.5 to 2 per cent, by weight, of the starch.

10. A non-congealing starch preparation comprising an insoluble unmodified starch and a triethanolamine soap, said soap being present in the approximate range of 0.5 to 2 per cent, by weight, of the starch.

11. Process of preparing a non-congealing starch preparation which comprises mixing a solution of an alkylolamine soap with a starch slurry, dewatering the starch slurry, and drying the starch.

12. Process of preparing a non-congealing starch preparation which comprises mixing a methanol solution of an alkylolamine soap with an aqueous starch slurry, dewatering the starch slurry, and drying the starch.

JAMES W. EVANS.